United States Patent
Schaefer

[19]

[11] Patent Number: 5,803,555
[45] Date of Patent: Sep. 8, 1998

[54] DAMPER FOR DAMPING PRESSURE FLUCTUATIONS IN BRAKE FLUID OF HYDRAULIC BRAKE SYSTEMS OF A VEHICLE

[75] Inventor: Ernst-Dieter Schaefer, Brackenheim, Germany

[73] Assignee: Robert Bosch GmbH, Stuttgart, Germany

[21] Appl. No.: 757,884

[22] Filed: Nov. 27, 1996

[30] Foreign Application Priority Data

Nov. 28, 1995 [DE] Germany .................. 195 44 221.0

[51] Int. Cl.⁶ .................................................. F16L 55/04
[52] U.S. Cl. .................. 303/87; 267/35; 138/30
[58] Field of Search .................. 188/347; 267/35, 267/116, 118, 121, 122, 152, 153; 303/87; 138/30, 31

[56] References Cited

U.S. PATENT DOCUMENTS

| | | | |
|---|---|---|---|
| 2,411,315 | 11/1946 | Ashton | 138/30 |
| 2,883,180 | 4/1959 | Moulton | 138/30 |
| 3,160,407 | 12/1964 | Vaugoyeau | 267/35 |
| 3,556,159 | 1/1971 | Bleasdale | 138/30 |
| 3,625,242 | 12/1971 | Ostwald | 138/30 |
| 4,687,188 | 8/1987 | Knurek et al. | 267/35 |
| 5,353,840 | 10/1994 | Paley et al. | 138/30 |
| 5,354,187 | 10/1994 | Holland et al. | 138/31 |
| 5,363,744 | 11/1994 | Pichler | 138/31 |
| 5,540,486 | 7/1996 | Linker | 303/87 |
| 5,682,923 | 11/1997 | Goloff et al. | 303/87 |

FOREIGN PATENT DOCUMENTS

| | | | |
|---|---|---|---|
| 032875 | 4/1992 | Germany | 303/87 |
| 4336464 | 4/1995 | Germany . | |

*Primary Examiner*—Chris Schwartz
*Attorney, Agent, or Firm*—Edwin R. Greigg; Ronald E. Greigg

[57] ABSTRACT

The invention relates to a damper for a slip-controlled brake system of a vehicle. An elastic damper body is disposed in a damper chamber cut as a bore into a hydraulic housing block of the vehicle brake system. The elastic damper body includes an encompassing sealing edge that partitions the damper chamber into a chamber that can be acted upon by fluid and a residual volume. During pressurization, this damper body is elastically compressed or expanded. The advantages of the damper of the invention are a simple design, good damping properties and its ability to avoid the formation of cracks in its damper body.

12 Claims, 3 Drawing Sheets

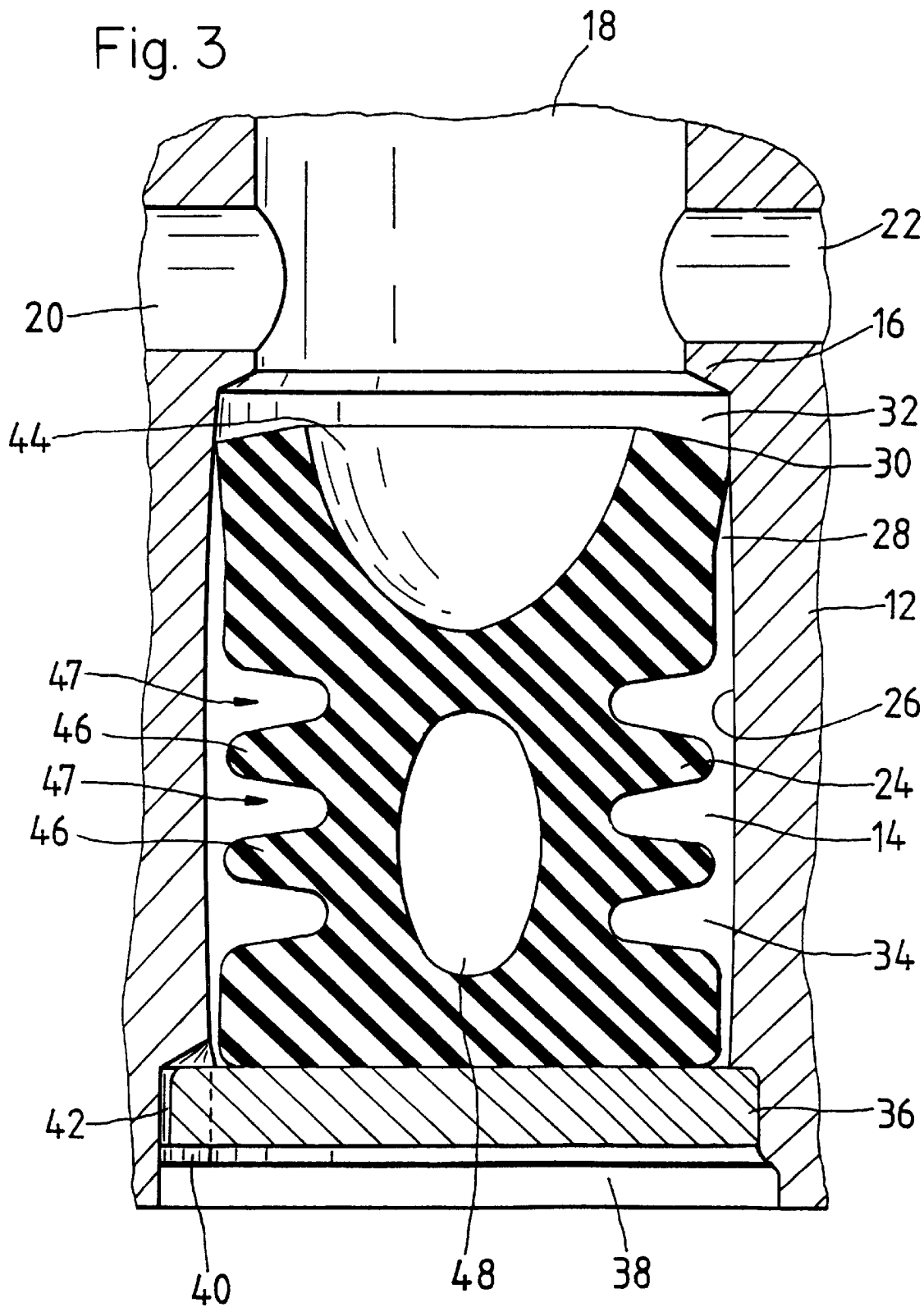

ABSTRACT# DAMPER FOR DAMPING PRESSURE FLUCTUATIONS IN BRAKE FLUID OF HYDRAULIC BRAKE SYSTEMS OF A VEHICLE

BACKGROUND OF THE INVENTION

The invention relates to a damper for a hydraulic brake system of a vehicle.

Known dampers of this type, as disclosed for example in German Patent Disclosure DE 43 36 464 A1, include a damper chamber, that is, a hollow chamber, that is subdivided by a diaphragm into a chamber filled with brake fluid and a residual volume that is typically filled with air and possibly communicates with the atmosphere.

Dampers of this type are used to damp pressure fluctuations, and particularly pressure shocks, in brake fluid of anti-lock, and/or tractioncontrolled, hydraulic vehicle brake systems, and consequently to counteract a buildup of noise and vibrations and avoid oscillation cavitation. In brake systems of this type, pressure fluctuations occur, for example, during operation of a circulating pump that is typically embodied as a reciprocating pump and, depending on its design, pumps a pulsing brake-fluid flow. Pressure shocks, i.e., abrupt changes in pressure—both increases and decreases in pressure—occur when magnet valves of the brake system are actuated to modulate braking pressure in the anti-lock and traction control.

OBJECT AND SUMMARY OF THE INVENTION

The damper of the invention encompasses a damper chamber, preferably cylindrical, that is filled with brake fluid or another fluid to be damped, and in which an elastic damper body is received which is adapted to the shape of the damper chamber, that is, it is also preferably cylindrical, and assumes a portion of the volume of the damper chamber. The damper body has an encompassing seal location, for example a sealing edge, that rests displaceably and sealingly against an encompassing wall of the damper chamber; with this edge, the damper body subdivides the damper chamber into a chamber filled with the fluid to be damped and a residual volume.

When changes in pressure occur in the fluid to be damped, the damper body reduces or increases its volume: it is axially compressed or expanded, causing a change in a volume of the fluid-filled chamber. Damping is effected by the shape-changing work performed to compress or expand the damper body, that is, by internal friction of the damper body comprising elastic material, and by the friction of the damper body against the surrounding chamber wall. Damping is likewise effected by compression and decompression of air or similar media contained in the residual volume of the damper chamber, and possibly by the throttling of the air or other media through a throttle restriction as they flow out of or into the residual volume of the damper chamber when the damper body is deformed.

The damper of the invention has the advantage of a simple design. It can comprise a bore cut into a hydraulic block to form the damper chamber, into which the elastic damper body is inserted. A further advantage lies in the good damping properties and the option of comparatively substantial changes in volume of the damper of the invention. Moreover, there is no danger that the damper body of the damper of the invention will tear, because it is not exposed to any punctiform, linear or even shearing stresses, as can occur, for example, at a clamping point of a diaphragm of known dampers.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 3 illustrates a cross-sectional view of the damper chamber which is elliptical or oval.

DESCRIPTION OF THE PREFERRED EMBODIMENT

Figure 1:
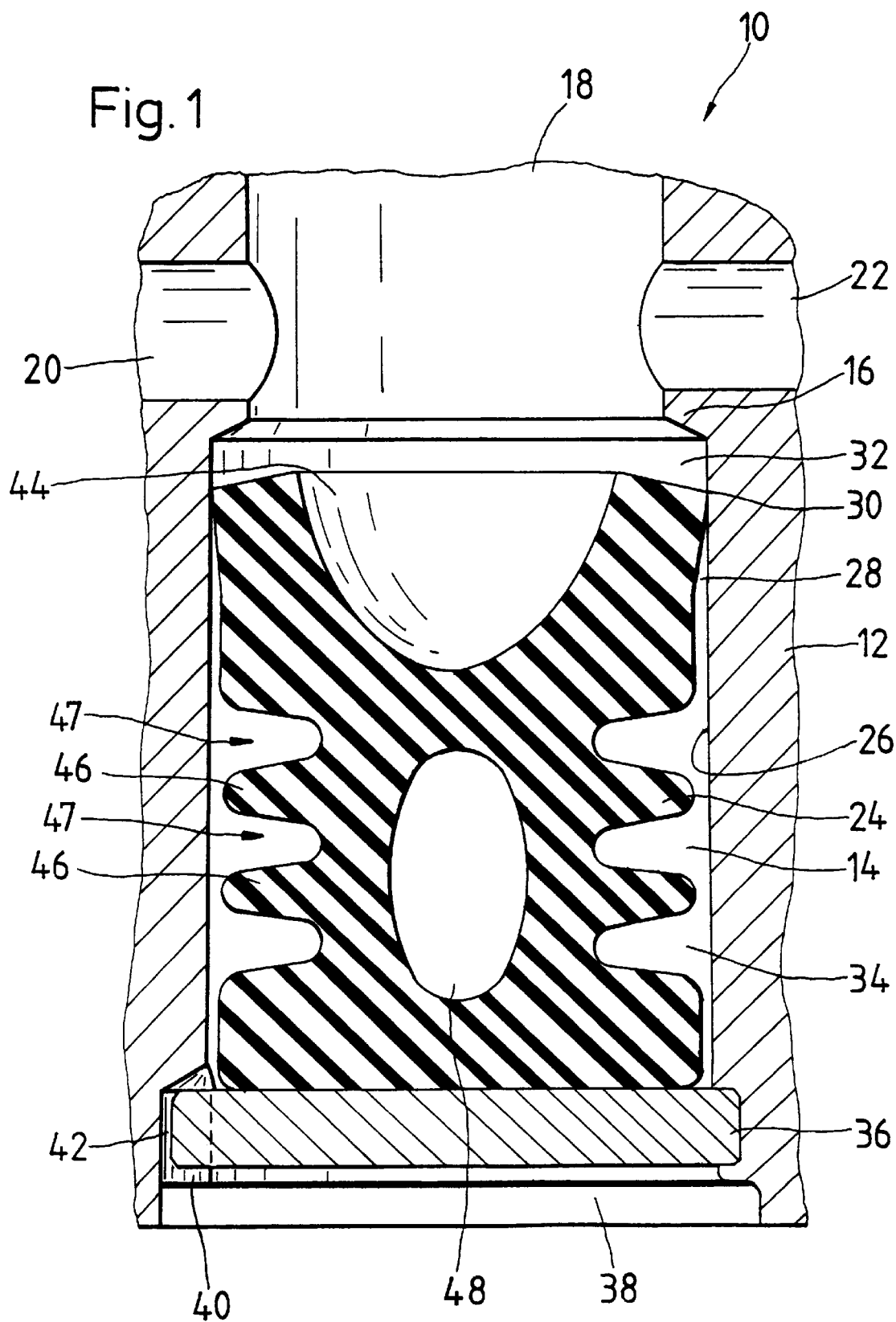
FIG. 1 shows a longitudinal section through a damper of the invention.

The damper indicated in its entirety by 10 is disposed in a hydraulic housing block 12 of a hydraulic vehicle brake system equipped with an anti-lock and traction control device. A bore in the hydraulic housing block 12 forms a damper chamber 14 of the damper 10. Instead of being cylindrical, as in the illustrated embodiment, the damper chamber 14 can also be embodied to have an oval or elliptical cross section for example. On its face end located in the interior of the hydraulic housing block 12, the damper chamber 14 tapers with a conical annular step 16. At the annular step 16, a fluid conduit 18 that has a large cross section and is in axial alignment with the damper chamber 14 discharges into the damping chamber 14; the damper 10 communicates with a reversing valve, not shown in FIG. 1, by way of this conduit. Close to the annular step 16, two further fluid conduits 20, 22 discharge into the fluid conduit 18, radially and preferably diametrically opposite one another. The fluid conduit 20 shown on the left in FIG. 1 is connected by way of a brake line, not shown, to a main brake cylinder, while the fluid conduit 22 shown on the right in FIG. 1 leads to an intake valve, also not shown in FIG. 1.

A damping body 24 is inserted into the damping chamber 14. It comprises an elastomer material, for example EPDM (ethylene propylene diene caoutchouc). Like the damping chamber 14, the damper body 24 has a cylindrical fundamental shape; its outer diameter is slightly smaller than the bore diameter of the damping chamber 14, so that a jacket chamber 28 exists between the damper body 24 and an encompassing wall 26 of the damper chamber 14. Furthermore, the damper body 24 is shorter than the damper chamber 14, so the damper body 24 is expanded elastically, and can be moved in the direction of the annular step 16 until it impacts against the annular step 16 of the damper chamber 14. The annular shoulder 16 of the damper chamber 14 forms a stop for the damper body 24 that prevents the damper body 24 from being sucked into the fluid conduit 18.

On its face end facing the annular step 16 of the damper chamber 14, the damper body 24 expands conically at an acute conical angle, so that an encompassing sealing edge 30 forms a seal location. The sealing edge 30 lies sealingly against the encompassing wall 26 of the damper chamber 14, and is displaceable along the encompassing wall 26. With its sealing edge 30, the damper body 24 subdivides the damper chamber 14 into a chamber 32, which is filled with brake fluid when the brake system is operative, and a residual volume 34.

On its face end remote from the annular step 16, the damper body 24 is supported against a circular support plate 36, which is fixedly connected to the hydraulic block 12 by an encompassing mortise 38.

The residual volume 34 of the damper chamber 14 communicates with the atmosphere through a ventilation bore 40. The diameter of the ventilation bore 40 is smaller by a multiple than the damping chamber 14. It is disposed paraxially to the damper chamber 14, in the region of the encompassing wall 26, in the hydraulic block 12 and discharges into the damper chamber 14, into which it only projects slightly. A significant portion of the cross section surface of the ventilation bore 40 is blocked by the protective plate 36, whose edge projects into the ventilation bore 40. Only a passage having a small cross section remains, forming a throttle restriction 42 as set forth above, the throttle restriction communicates with the atmosphere.

On its end face facing the annular step 16 of the damper chamber 14, the damper body 24 has a dome-shaped recess 44, the interior space of which constitutes part of the chamber 32 of the damper 10 of the invention to be filled with the fluid to be damped. When the brake system is operative, the recess 44, which extends in the axial direction into the encompassing sealing edge 30, is filled with brake fluid. During an increase in pressure, the fluid presses the segment of the damper body 24 on the side of the fluid conduit radially into two parts, thus effecting a powerful pressing of the sealing edge 30 against the encompassing wall 26 of the damper chamber 14. In this way, the sealing effect of the damper body 24 is increased as the brake fluid pressure increases.

The damper body 24 has peripheral ribs 46, which are formed by encompassing, groove like recesses 47 of the damper body 24. The cross section of the damper body 24 is reduced in the region of these recesses 47, that is, between the ribs 46. The damper characteristic can be influenced by the taperings of the cross section and an associated increase in the residual volume 34 of the damper chamber 14. Moreover, the ribs 46 prevent the damper body 24 from buckling under stress.

In its interior, the damper body 24 has a connecting chamber 48 in the form of a hole that penetrates the damper body 24 transversely and has an elliptical cross section. This connecting chamber 48 also reduces the cross section of the damper body 24, and has the task of exerting a desirable influence on the damping characteristic.

The damper 10 of the invention functions in the following manner: When pressure fluctuations occur in the brake fluid, the damper body 24 is axially compressed or expanded. A change takes place in the volume of the chamber 32 of the damper 10, the chamber being filled with brake fluid. A damping of the pressure fluctuations in the brake fluid is effected by internal friction when the damper body 24 changes shape, by friction of the sealing edge 30 against the encompassing wall 26 of the damper chamber 14, by compression or decompression of air contained in the residual volume 34 of the damper chamber 14, and by displacement or aspiration of the air out of or into the residual volume 34 through the throttle restriction 42. Pressure fluctuations in the brake fluid, which communicates with the damper 10 by way of the fluid conduits 18, 20, 22, are reduced; abrupt changes in pressure are reduced, and the brake fluid flow is evened out.

Figure 2:
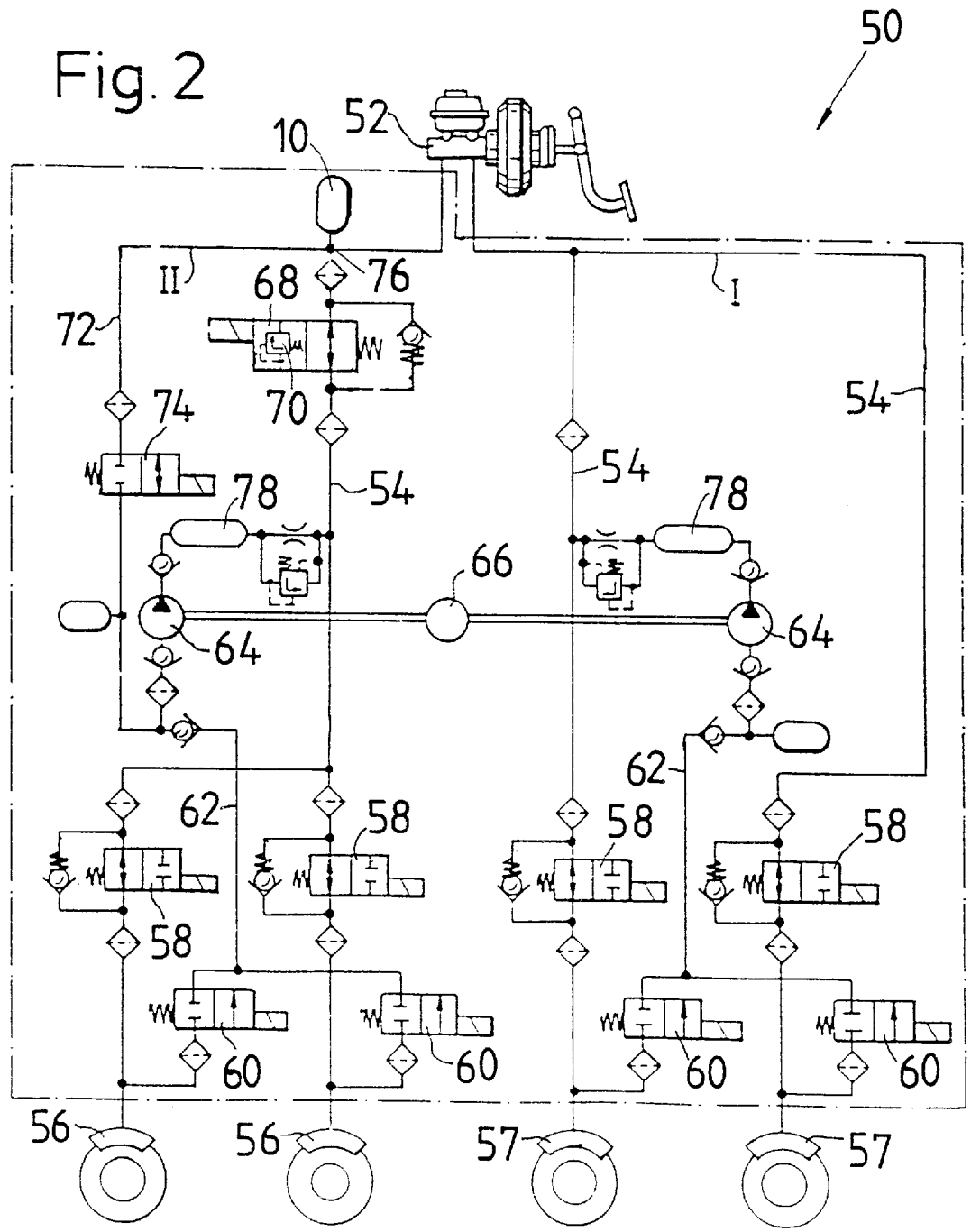
FIG. 2 shows a hydraulic circuit diagram of a vehicle brake system employing the damper of the invention.

FIG. 2 illustrates the use of the damper 10 of the invention in an anti-lock and traction-controlled, hydraulic vehicle brake system of a vehicle. The brake system indicated in its entirety by 50 has two brake circuits I, II, which are independent of one another and are connected to a pedal-actuated main brake cylinder 52. A main brake line 54 respectively leads from the main brake cylinder 52 to wheel-brake cylinders 56, 57; an intake valve 58 which is open in the inoperative position is respectively disposed upstream of these cylinders. A return line 62 leads from the wheel-brake cylinders 56, 57 to an aspiration side of a recirculating pump 64 embodied as a reciprocating pump, which is connected by its pressure side to the main brake line 54. An outlet valve 60, which is closed in the inoperative position, is interposed between each wheel-brake cylinder and pump. The recirculating pumps 64 of the two brake circuits I, II are driven by a common electric motor 66.

The anti-lock control is effected in a manner known per se by means of brake pressure modulation in the wheel-brake cylinders 56, 57 via the intake and outlet valves 58, 60 and the recirculating pumps 64.

The vehicle wheels driven by the brake cylinders 56 are connected to the brake circuit II shown on the left in FIG. 2. For traction control, this brake circuit II additionally includes a reversing valve 68, which is open in the inoperative position, and is connected into the main brake line 54 between the main brake cylinder 52, on one side, and the intake valves 58 and the connection of the pressure side of the recirculating pump 64, on the other side. A pressure-limiting valve 70 that is effective in a closed switching position of the reversing valve 68 is integrated into the reversing valve 68. An aspiration line 72 leads from the main brake cylinder 52 to the aspiration side of the recirculating pump 64 of the slip-controlled brake circuit II. An aspiration valve 74 that is closed in the inoperative position is connected into the aspiration line 72. The traction control is effected in a manner known per se by means of brake pressure modulation in the vehicle wheels driven by wheel-brake cylinders 56 via the intake and discharge valves 58, 60 and the recirculating pump 64, with the wheel-brake cylinders 56 being separated from the main brake cylinder 52 by the closing of the reversing valve 68, and the recirculating pump 64 receives brake fluid from the main brake cylinder 52 through the aspiration line 72 and the open aspiration valve 74.

The damper 10 of the invention is used to damp pressure fluctuations in the brake fluid, and particularly to reduce pressure shocks, especially those which occur in traction control. The damper is connected to a branch point 76 of the main brake line 54 between the main brake cylinder 52 and the reversing valve 68, from which the aspiration line 72 branches off to the recirculating pump 64. Further dampers 78 present in the vehicle brake system 50, for example on the pressure side of the recirculating pumps 64, can be embodied in the manner of the damper 10 of the invention.

The valves 58, 60, 68, 74 of the vehicle brake system 50 are 2/2-way magnet valves.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. A damper for a hydraulic brake system of a vehicle comprising a slip-control device, having an elastic damper body (24) supported in a bottom end by a support plate (36) in a damper chamber (14) that can be filled with a fluid in an area (32) of said damper chamber above an upper end of said elastic damper body which exposes said upper end to said fluid, said elastic damper body (24) located within said damper chamber can be elastically compressed and expanded in a longitudinal direction of the damper chamber

(14) by pressurization of said fluid in said upper end of the damper chamber (14), said upper end of said damper body (24) that is exposed to said fluid has an encompassing sealing edge (30) which rests, sealingly on a circumferential wall (26) of said damper chamber (14) so as to be axially displaced in a longitudinal direction by said fluid on said upper end, said elastic damper body (24) includes recesses (47) on a circumference which define a fluid free volume (34) in said damper chamber that communicates with an outside atmosphere through a throttle restriction (42).

2. The damper in accordance with claim 1, in which the damper chamber (14) and the damper body (24) are cylindrical.

3. The damper in accordance with claim 2, in which the damper body (24) has at least one connecting chamber (48).

4. The damper in accordance with claim 3, in which the damper chamber (24) has a recess (44) that can be filled with fluid and which extends, in an axial direction to the encompassing sealing edge (30).

5. The damper in accordance with claim 1, in which the damper body (24) has at least one connecting chamber (48).

6. The damper in accordance with claim 5, in which the damper chamber (24) has a recess (44) that can be filled with fluid and which extends, in an axial direction to the encompassing sealing edge (30).

7. A damper as set forth in claim 1, in which said damper chamber is oval in shape.

8. The damper in accordance with claim 7, in which the damper body (24) has at least one connecting chamber (48).

9. A damper as set forth in claim 1, in which said damper chamber is elliptical in shape.

10. The damper in accordance with claim 9, in which the damper body (24) has at least one connecting chamber (48).

11. The damper in accordance with claim 1, in which the damper chamber (24) has a recess (44) on said upper end that can be filled with fluid and which extends, in an axial direction to the encompassing sealing edge (30).

12. The damper in accordance with claim 1, in which the damper chamber (14) is cut into a hydraulic block (12).

* * * * *